(12) United States Patent
Tiwari et al.

(10) Patent No.: US 12,101,714 B2
(45) Date of Patent: Sep. 24, 2024

(54) PROCEDURE TO UPDATE THE PARAMETERS RELATED TO UNIFIED ACCESS CONTROL

(71) Applicant: NEC Corporation, Tokyo (JP)

(72) Inventors: Kundan Tiwari, Tamil Nadu (IN); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 610 days.

(21) Appl. No.: 17/281,648

(22) PCT Filed: Oct. 4, 2019

(86) PCT No.: PCT/JP2019/039291
§ 371 (c)(1),
(2) Date: Mar. 31, 2021

(87) PCT Pub. No.: WO2020/071536
PCT Pub. Date: Apr. 9, 2020

(65) Prior Publication Data
US 2021/0392574 A1    Dec. 16, 2021

(30) Foreign Application Priority Data
Oct. 4, 2018    (IN) .............................. 201811037573

(51) Int. Cl.
*H04W 48/18*    (2009.01)
*H04W 48/06*    (2009.01)
(Continued)

(52) U.S. Cl.
CPC ........... *H04W 48/18* (2013.01); *H04W 48/06* (2013.01); *H04W 68/005* (2013.01); *H04W 76/10* (2018.02); *H04W 84/042* (2013.01)

(58) Field of Classification Search
CPC ..... H04W 48/18; H04W 76/10; H04W 48/06; H04W 68/005; H04W 84/042
(Continued)

(56) References Cited

U.S. PATENT DOCUMENTS

2012/0063428 A1* 3/2012 Ng .................... H04W 36/0016
370/338
2012/0269099 A1* 10/2012 Chin .................... H04W 76/12
370/259
(Continued)

FOREIGN PATENT DOCUMENTS

WO    2018/142200 A1    8/2018

OTHER PUBLICATIONS

International Search Report for PCT Application No. PCT/JP2019/039291, mailed on Nov. 26, 2019.
(Continued)

*Primary Examiner* — Mark G. Pannell

(57) ABSTRACT

A UE is in a connected mode over a non 3GPP access and in an idle mode over a 3GPP access. The UE receives a NOTIFICATION message from a core network node over the non-3GPP access. The UE determines, when performing a service request procedure, MT_acc=0 as an access category to be associated with the service request procedure upon receiving the NOTIFICATION message. The UE checks whether an access attempt for an access category is barred or allowed. When the access category is allowed, the UE sends a RRC connection setup request to a base station and transmits a SERVICE REQUEST message to the core network node after a RRC connection is established.

4 Claims, 10 Drawing Sheets

(51) Int. Cl.
*H04W 68/00* (2009.01)
*H04W 76/10* (2018.01)
*H04W 84/04* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2014/0099912 | A1* | 4/2014 | Lee | H04W 48/08 455/450 |
| 2015/0230092 | A1* | 8/2015 | Ueki | H04W 48/02 455/411 |
| 2015/0271746 | A1* | 9/2015 | Jang | H04W 4/70 370/328 |
| 2016/0135231 | A1* | 5/2016 | Lee | H04W 52/0219 370/329 |
| 2016/0295549 | A1* | 10/2016 | Sebire | H04W 68/02 |
| 2016/0345262 | A1* | 11/2016 | Jain | H04W 52/0235 |
| 2018/0199273 | A1 | 7/2018 | Chun | |
| 2018/0367980 | A1* | 12/2018 | Lee | H04L 67/51 |
| 2019/0007992 | A1* | 1/2019 | Kim | H04W 76/27 |
| 2019/0045577 | A1* | 2/2019 | Kim | H04W 76/50 |
| 2019/0059067 | A1* | 2/2019 | Lee | H04W 28/10 |
| 2019/0116546 | A1* | 4/2019 | Kang | H04W 68/02 |
| 2019/0159108 | A1* | 5/2019 | Lee | H04W 76/27 |
| 2019/0174392 | A1* | 6/2019 | Chun | H04W 48/08 |
| 2019/0268827 | A1* | 8/2019 | Kim | H04W 48/02 |
| 2019/0349816 | A1* | 11/2019 | Kiss | H04W 36/0022 |
| 2019/0349849 | A1* | 11/2019 | Kavuri | H04W 36/0022 |
| 2019/0394833 | A1* | 12/2019 | Talebi Fard | H04W 68/005 |
| 2020/0045753 | A1* | 2/2020 | Dao | H04W 4/08 |
| 2020/0053830 | A1* | 2/2020 | Venkataraman | H04W 60/005 |
| 2020/0084691 | A1* | 3/2020 | Wallentin | H04W 76/27 |
| 2020/0137672 | A1* | 4/2020 | Rommer | H04W 8/08 |
| 2020/0187092 | A1* | 6/2020 | Lindheimer | H04W 48/08 |
| 2020/0245383 | A1* | 7/2020 | Lu | H04W 76/12 |
| 2020/0288375 | A1* | 9/2020 | Jia | H04L 65/40 |
| 2020/0367149 | A1* | 11/2020 | Kang | H04W 28/0247 |
| 2020/0404734 | A1* | 12/2020 | Watfa | H04W 76/25 |
| 2021/0153286 | A1* | 5/2021 | Park | H04W 76/22 |
| 2021/0185585 | A1* | 6/2021 | Chen | H04W 48/16 |
| 2021/0212021 | A1* | 7/2021 | Youn | H04W 60/00 |
| 2023/0081141 | A1* | 3/2023 | Jangid | H04W 8/08 370/329 |

OTHER PUBLICATIONS

Written opinion for PCT Application No. PCT/JP2019/039291, mailed on Nov. 26, 2019.
3GPP TR 21.905: "Vocabulary for 3GPP Specifications". V15.0.0 (Mar. 2018).
3GPP TS 23.501: "System Architecture for the 5G System; Stage 2". V15.2.0 (Jun. 2018).
3GPP TS 23.502: "Procedures for the 5G System; Stage 2" V15.2.0 (Jun. 2018).
3GPP TS 24.501: "Non-Access-Stratum (NAS) protocol Stage 3" V15.0.0 (Jun. 2018).
3GPP TS 38.413: "NG Application Protocol (NGAP) " V15.0.0 (Jun. 2018).
3GPP TS 38.331: "Radio Resource Control (RRC) protocol specification" V15.3.0 (Sep. 2018).
LG Electronics, Resolution of Editor's note on RRC establishment cause, 3GPP TSG CT WG1 #110 C1-182380, Apr. 9, 2018.
Vivo, Notification response, 3GPP TSG SA WG2 #126 S2-181603, Feb. 13, 2018.
Extended European Search Report for EP Application No. 19868477.1 dated on Nov. 30, 2021.
"3rd Generation Partnership Project; Technical Specification Group Core Network and Terminals; 5G System—Phase 1; CT WG1 Aspects (Release 15)", 3GPP TR 24.890 V15.1.0, Mar. 29, 2018.

\* cited by examiner

```
uac-BarringInfo                          SEQUENCE {
        uac-BarringForCommon                  UAC-
BarringPerCatList           OPTIONAL,       -- Need S
        uac-BarringPerPLMN-List               UAC-BarringPerPLMN
-List          OPTIONAL,       -- Need S
        uac-BarringInfoSetList                UAC-BarringInfoSetList,
        uac-AccessCategory1-SelectionAssistanceInfo  CHOICE {
                plmnCommon             UAC-AccessCategory1-SelectionAssistanceInfo,
                individualPLMNList    SEQUENCE (SIZE (2..maxPLMN)) OF  UAC-AccessCategory1
-SelectionAssistanceInfo
        }                   OPTIONAL
```

Fig. 10

PROCEDURE TO UPDATE THE PARAMETERS RELATED TO UNIFIED ACCESS CONTROL

This application is a National Stage Entry of PCT/JP2019/039291 filed on Oct. 4, 2019, which claims priority from Indian Patent Application 201811037573 filed on Oct. 4, 2018, the contents of all of which are incorporated herein by reference, in their entirety.

TECHNICAL FIELD

The present disclosure relates to a UE, a method for a UE, and a wireless communication system.

BACKGROUND ART

A 5GS includes a 5GC and a NG-RAN. In the 5GS, Unified Access Control (UAC) is defined to perform the access control of the signalling from the UEs in various situations (e.g. congestion, network maintenance etc.). The UAC can be realized by the NG-RAN to broadcast access control information over the broadcasting channel I.E. Broadcast Control Channel (BCCH). Based on the access control information over the broadcasting channel where the UE listens to, the UE can take a decision whether the UE can allowed to access to the 5GS or not. For example, if an access restriction to the Mobile origination Data is indicated in the broadcasting channel, the UE cannot initiate the service request to the 5GS although the UE has pending UL packets to be sent.

The UE is configured with an access identity and the event that is categorized as an access category. The access category is further categorized with as a standard access category and an operator defined access category. Hereinafter, the operator defined access category is also denoted as "PLMN operator defined access category". The PLMN operator defined access category is sent to the UE in a NAS message. The current operator defined access categories are 1) DNN, 2) 5G QoS ID, 3) OS ID+APP ID and 4) S-NSSAI. The operator defined access categories are per PLMN basis.

When the UE is required to access a network, the NAS layer of the UE determines an access type and the access category of the event. The NAS layer of the UE gives this parameter to the Access Stratum (e.g. RRC layer, SDAP layer, PDCP layer, RLC layer, MAC layer and PHY layer) of the UE for the access control procedure. The Access Stratum (AS) layer based on the access category and access type determines whether the access to the network is allowed or not. If the access to the network is allowed then the UE establishes the RRC connection and then sends the initial NAS message. If the access to the network is not allowed for the event then the AS layer of the UE informs the NAS layer of the UE that the access is not allowed for the event. In this case, the NAS layer neither establishes the NAS signalling connection nor sends the NAS message till the access to the network becomes allowed.

Furthermore, a UE can be registered to a same AMF via a 3GPP access and a non-3GPP access when PLMNs selected for the 3GPP access and the non-3GPP access are the same. In this case the AMF assigns a single temporary identity 5G-GUTI for both the 3GPP access and the non-3GPP access. The UE maintains a 5GMM state, 5GMM parameters, 5GMM status, Connection Management states separately and independently for both the 3GPP access and the non-3GPP access.

When a UE is in a CM-CONNECTED mode over a 3GPP access and a CM-IDLE mode over a non-3GPP and the 5GC has mobile terminated (MT) data for a PDU session associated with a non-3GPP access, the AMF sends a NOTIFICATION message over a 3GPP access. When the UE receives a NOTIFICATION message over a 3GPP access, the UE sends a Service Request message containing a PDU session identity (s) for which the establishment of the user plane over a 3GPP access is allowed. The network establishes the user plane for the PDU session (s) indicated in the service request message and the user data is pending for the PDU session.

Similarly, when a UE is in a CM-CONNECTED mode over a non-3GPP access and a CM-IDLE mode over a 3GPP access and the 5GC has MT data for a PDU session associated with a 3GPP access, the AMF either pages the UE via a 3GPP access or send a NOTIFICATION message over a non-3GPP access. When the UE receives a NOTIFICATION message over a non-3GPP access, the UE sends a Service Request message to establish the user plane over a 3GPP access. The 5GC establishes the user plane for the PDU session (s) associated with a 3GPP access for which the 5GC has MT user data pending.

CITATION LIST

Non Patent Literature

NPL 1: 3GPP TR 21.905: "Vocabulary for 3GPP Specifications". V15.0.0 (2018-03).
NPL 2: 3GPP TS 23.501: "System Architecture for the 5G System; Stage 2". V15.2.0 (2018-06).
NPL 3: 3GPP TS 23.502: "Procedures for the 5G System; Stage 2" V15.2.0 (2018-06).
NPL 4: 3GPP TS 24.501: "Non-Access-Stratum (NAS) protocol Stage 3" V15.0.0 (2018-06).
NPL 5: 3GPP TS 38.413: "NG Application Protocol (NGAP)" V15.0.0 (2018-06).
NPL 6: 3GPP TS 38.331": "Radio Resource Control (RRC) protocol specification" V15.3.0 (2018-09).

SUMMARY OF INVENTION

Technical Problem

Problem Statement 1:

When the 5GC decides to start access control to mitigate the congestion related to a DNN or an OS ID+APP ID or a 5G QoS, there is no procedure defined between the NG-RAN and the 5GC to invoke UAC for the DNN, the APP ID+OS ID or the 5G QoS. As the result, the 5GS might get out of the service due to a massive amount of traffic from UEs as the NG-RAN cannot perform any access control for the DNN, the APP ID+OS ID or the 5G QoS.

Problem Statement 2:

When a 5GS experiences congestion due to signalling related to a S-NSSAI and a DNN combination, the 5GS has no way to protect itself from signalling related to the S-NSSAI and the DNN combination and also has no way to mitigate the congestion related to the S-NSSAI and the DNN combination due to lack of specification in 3GPP. As a result, 3GPP operators cannot have a UAC mechanism targeting signal suppression on a particular S-NSSAI and DNN combination.

Problem Statement 3:

In the operator defined access category definition, maximum 32 access category numbers can be provisioned for the operator defined access category number. In addition, 32 access category spaces have to share with an UAC based on the S-NSSAI, the DNN, the APP ID and OSS ID combination and the 5G QoS. However the S-NSSAI is 4 byte i.e. it has much higher value than 32. So the assigning a unique operator defined access category number to each S-NSSAI value is not feasible. As a result, 3GPP operators may not use the UAC for the operator defined access category for all required patterns of the S-NSSAI, the DNN, the APP ID and OSS ID combination and the 5G QoS.

Problem Statement 4:

The operator defined access category definition is sent to the UE using a NAS message and this operator defined access category definition is stored when the UE is switched off and is reused when the UE is switched on again. However, it is not clear, when the USIM is changed, the UE will reuse the operator defined access category definition or not. For example, the operator defined access category definition may be stored as with mentioned the above if the USIM is changed during the UE is switched off. However, it is unclear whether or not the UE can reuse the operator defined access category definition if the USIM is changed from previous USIM when the UE is switched on. The SUCI or SUPI or SUCI and SUPI may be changed due to USIM change. The SUCI or SUPI or SUCI and SUPI may not be changed due to USIM change.

Furthermore, the USIM change may be occurred during the UE is switched on. For example, the USIM is changed by removing and inserting the USIM during the UE is switched on by the SIM tool kit function. Therefore, this undefined UE behavior will lead to different implementation in the different UEs and hence in this scenario the operator cannot control the UE behavior which will lead to more congestion in the network.

Problem Statement 5:

The 3GPP standard defines the protection of the temporary identities from an intruder to protect a user from being identified and located by the intruder. In the same way, a protection of the ODACD may be needed to be defined in the standard. More specifically, the ODACD is sent in a NAS message. The ODACD contains information related to unified access control and these parameters can be changed by the intruder over the air. If the UE receives modified ODACD parameters and uses the received ODACD for the access control then the UE applies a wrong ODACD and hence access control may not work. The operator cannot control the UE access to the network using the UAC and hence the operator cannot protect its network in congestion scenario or other cases when the operator invokes UAC.

Problem Statement 6:

When a UE receives the NOTIFICATION message as mentioned the above over a non-3GPP access or over a 3GPP access, the UE initiates a service request procedure. However, it is not clear what the access category of this service request procedure is. This will lead to different UE implementations between the UE vendors for this scenario. As a result, the network operator may not control the UE behavior for access attempt to the 5GS for this scenario.

In addition, when the UE receives the NOTIFICATION message and the UE initiates service Request procedure. If the access to the access category associated to the service request procedure is barred then the UE behavior is not clear. In the absence of clear UE behavior, the network cannot control UEs access attempt to the 5GS using the UAC.

In view of the problems described above, the present disclosure aims to provide a solution to solve at least one of the various problems.

Solution to Problem

In an aspect of the present disclosure, a method for a user equipment, UE, is provided, the method including: receiving, when the UE is in a connected mode over a non 3GPP access and in an idle mode over a 3GPP access, a NOTIFICATION message from a core network node over the non-3GPP access; determining, when performing a service request procedure, MT_acc=0 as an access category to be associated with the service request procedure upon receiving the NOTIFICATION message; checking whether an access attempt for an access category is barred or allowed; and sending, when the access category is allowed, a Radio Resource Control, RRC, connection setup request to a base station and transmitting, to the core network node, a SERVICE REQUEST message after a RRC connection is established.

In another aspect of the present disclosure, a user equipment, UE, is provided, the UE including, a transceiver circuit and a controller; wherein the controller configured to: receive, via the transceiver circuit, when the UE is in a connected mode over a non 3GPP access and in an idle mode over a 3GPP access, a NOTIFICATION message from a core network node over the non-3GPP access; determine, when performing a service request procedure, MT_acc=0 as an access category to be associated with the service request procedure upon receiving the NOTIFICATION message, check whether an access attempt for an access category is barred or allowed; send, via the transceiver circuit, when the access category is allowed, a Radio Resource Control, RRC, connection setup request to a base station and transmit, via the transceiver circuit, a SERVICE REQUEST message to the core network node after a RRC connection is established.

In other aspect of the present disclosure, a communication system is provided, the communication system including: a user equipment, UE; and a base station, wherein the UE comprising, a transceiver circuit and a controller; wherein the controller configured to: receive, via the transceiver circuit, when the UE is in a connected mode over a non 3GPP access and in an idle mode over a 3GPP access, a NOTIFICATION message from a core network node over the non-3GPP access; determine, when performing a service request procedure, MT_acc=0 as an access category to be associated with the service request procedure upon receiving the NOTIFICATION message, check whether an access attempt for an access category is barred or allowed; and send, via the transceiver circuit, when the access category is allowed, a Radio Resource Control, RRC, connection setup request to the base station, and transmit, via the transceiver circuit, a SERVICE REQUEST message to the core network node after a RRC connection is established.

In a further aspect of the present disclosure, a method for a user equipment, UE, is provided, the method including receiving, when the UE is in a connected state over a non 3GPP access and in an idle state over a 3GPP access, a NOTIFICATION message from a 5th generation Core Network, 5GC, over the non-3GPP access; associating, when performing a service request procedure, one of an access category MT_acc=0, an access category MO_data=7, and a new access category to the service request procedure; checking whether an access attempt for an access category is barred or allowed; sending, when the access category is barred, a NOTIFICATION RESPONSE message to the 5GC, and not initiating the service request procedure to re-establish a user plane for one or more Protocol Data Unit, PDU, sessions associated with the 3GPP access; and sending, when the access category is allowed, a Radio Resource Control, RRC, setup request to a base station in a 5th generation system, 5GS, and transmitting a SERVICE REQUEST message after a RRC connection is established.

BRIEF DESCRIPTION OF DRAWINGS

FIG. 10 is a diagram showing information elements related to the category value of the category type.

DESCRIPTION OF EMBODIMENTS

Abbreviations

Figure 1:
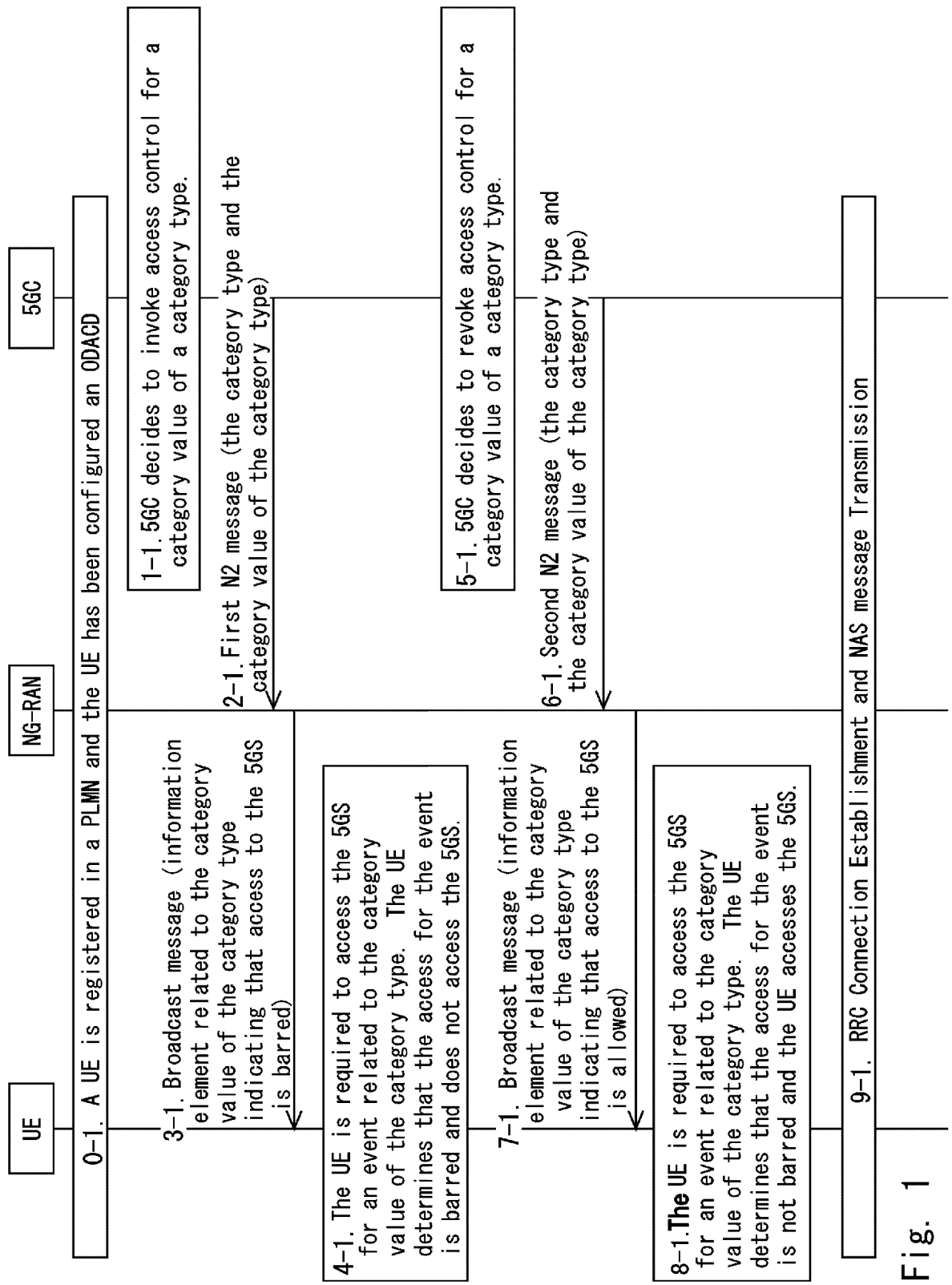
FIG. 1 is a flow chart showing a signalling flow of a method according to a first aspect of the present disclosure.

For the purposes of the present disclosure, the abbreviations given in 3GPP TR 21.905 (NPL1) and the following are applied. An abbreviation defined in the present disclosure takes precedence over the definition of the same abbreviation, if any, in 3GPP TR 21.905 (NPL1).

5GC 5G Core Network
5GS 5G System
5G-AN 5G Access Network
5G-GUTI 5G Globally Unique Temporary Identifier
5G S-TMSI 5G S-Temporary Mobile Subscription Identifier
5QI 5G QoS Identifier
AF Application Function
AMF Access and Mobility Management Function
AN Access Node
AS Access Stratum
AUSF Authentication Server Function
CM Connection Management
CP Control Plane
CSFB Circuit Switched (CS) Fallback
DL Downlink
DN Data Network
DNAI DN Access Identifier
DNN Data Network Name
EDT Early Data Transmission
EPS Evolved Packet System
EPC Evolved Packet Core
FQDN Fully Qualified Domain Name
GFBR Guaranteed Flow Bit Rate
GMLC Gateway Mobile Location Centre
GPSI Generic Public Subscription Identifier
GUAMI Globally Unique AMF Identifier
HR Home Routed (roaming)
I-RNTI I-Radio Network Temporary Identifier
LADN Local Area Data Network
LBO Local Break Out (roaming)
LMF Location Management Function
LRF Location Retrieval Function
MAC Medium Access Control
MFBR Maximum Flow Bit Rate
MICO Mobile Initiated Connection Only
MME Mobility Management Entity
N3IWF Non-3GPP Inter Working Function
NAI Network Access Identifier
NAS Non-Access Stratum
NEF Network Exposure Function
NF Network Function
NG-RAN Next Generation Radio Access Network
NR New Radio
NRF Network Repository Function
NSI ID Network Slice Instance Identifier
NSSAI Network Slice Selection Assistance Information
NSSF Network Slice Selection Function
NSSP Network Slice Selection Policy
NWDAF Network Data Analytics Function
PCF Policy Control Function
PEI Permanent Equipment Identifier
PER Packet Error Rate
PFD Packet Flow Description
PLMN Public land mobile network
PPD Paging Policy Differentiation
PPI Paging Policy Indicator
PSA PDU Session Anchor
QFI QoS Flow Identifier
QoE Quality of Experience
(R)AN (Radio) Access Network
RLC Radio Link Control
RM Registration Management
RQA Reflective QoS Attribute
RQI Reflective QoS Indication
RRC Radio Resource Control
SA NR Standalone New Radio
SBA Service Based Architecture
SBI Service Based Interface
SD Slice Differentiator
SDAP Service Data Adaptation Protocol
SEAF Security Anchor Functionality
SEPP Security Edge Protection Proxy
SMF Session Management Function
S-NSSAI Single Network Slice Selection Assistance Information
SSC Session and Service Continuity
SST Slice/Service Type
SUCI Subscription Concealed Identifier
SUPI Subscription Permanent Identifier
UAC Unified Access Control
UDSF Unstructured Data Storage Function
UL Uplink
UL CL Uplink Classifier
UPF User Plane Function
UDR Unified Data Repository
URSP UE Route Selection Policy
SMS Short Message Service
SMSF SMS Function
UAC Unified Access Control
ODACD Operator Defined Access Category Definitions
OS Operating System
MO Mobile Originated
MT Mobile Terminated
USIM Universal Subscriber Identity Module
UICC Universal integrated circuit card

Definitions

For the purposes of the present disclosure, the terms and definitions given in 3GPP TR 21.905 (NPL1) and the NPL2 to NPL6 are applied. A term defined in the present disclosure takes precedence over the definition of the same term, if any, in 3GPP TR 21.905 (NPL1).

First Aspect (Solution 1 to Solve the Problem Statements 1, 2 and 3):

In a first aspect, a NAS message acknowledging the reception of an ODACD in a NAS message is transmitted.

The outline of the solution 1 is given below.

1. The 5GC configures the UE with operator defined access category definitions.

2. When the 5GC decides to invoke or revoke access barring for a category value of a category type, the 5GC sends a N2 message containing at least one of the category value, the category type and an operator-defined access category number associated with the category value of the category type requesting the NG-RAN invoke or revoke the access barring for the access value of the access type.

3. Upon receiving, the N2 message invokes or revokes access barring for the category value of the category type as per the request received in the N2 message. The NG-RAN broadcasts a system information block containing access barring information related to the category value of the category type. The access barring information indicates that the access is barred for the category value of the category type if the NG-RAN invokes the barring of the category value of the category type. The access barring information indicates that the access is not barred for the category value of the category type if the NG-RAN revokes the barring of the category value of the category type.

FIG. 1 shows a signalling flow of a method according to a first aspect of the present disclosure. The detailed steps of the solution 1 are described below.

FIG. 1 illustrates separate two flows. The steps 1-1 to 4-1 take place when the 5GC decides to enforce the UAC, while steps 5-1 to 9-1 take place when the 5GC decides to stop the UAC. These two flows are related with regard to the UAC but can be considered as independent flows.

0-1. A UE is registered to a PLMN successfully and the UE is configured with at least one ODACD. The ODACD is an Operator-defined access category which is defined in 3GPP TS 24.501 (NPL4).

1-1. The AMF decides to invoke access control for a criteria value of a criteria type.

2-1. The AMF sends a first N2 message containing at least one of the criteria value, the criteria type and an operator-defined access category number associated with the criteria value of the criteria type requesting to the NG-RAN to start access control for the criteria value of the criteria type.

In one example, the first N2 message is NGAP OVERLOAD START, an existing NGAP message as defined in 3GPP TS 38.413 (NPL5) or a new NGAP message.

3-1. Upon receiving the first N2 message, the NG-RAN invokes a UAC procedure for the criteria value of the criteria type by broadcasting system information (e.g. System Information Block 1, i.e. SIB 1) containing an information element related to the criteria value of the criteria type. The information element indicates that access to the criteria value of the criteria type is barred.

In one example, the NG-RAN broadcasts the operator defined access category number associated with the criteria value of the criteria type.

4-1. When a UE wants to access the 5GS (For example via the NG-RAN) for an event related to the criteria value of the criteria type, the UE first checks the broadcasted system information and understands whether the access to the event related to the criteria value of the criteria type is barred or not. When the UE understands that it is barred, the UE does not access the 5GS (i.e. NG-RAN) for the event corresponding to the category value of the category type. That is, the UE does not initiates the procedure to establish the RRC connection for the event corresponding to the category value of the category type.

In one example based, the UE maps the criteria value of the criteria type of the event to the operator-defined access category number according to the operator-defined access category definition sent to the UE in step 0-1, reads broadcasted system information (e.g. SIB 1) containing access barring information related to the operator-defined access category number, and understands if the access for the operator-defined access category number is barred or not. If the access for the operator-defined access category number is barred then the UE does not access to the 5GS (i.e. NG-RAN).

5-1. The AMF decides to revoke access control for a criteria value of a criteria type.

6-1. The AMF sends a second N2 message containing at least one of the criteria value, the criteria type and an operator-defined access category number associated with the criteria value of the criteria type requesting to the NG-RAN to stop access control for the criteria value of the criteria type.

In one example, the second N2 message is NGAP OVERLOAD STOP, an existing NGAP message as defined in 3GPP TS 38.413 (NPL5) or a new NGAP message.

7-1. Upon receiving the second N2 message, the NG-RAN invokes the UAC procedure related to the criteria value of the criteria type by broadcasting the system information containing the information element related to the criteria value of the criteria type indicating that the criteria value of the criteria type is not barred.

8-1. When a UE wants to access the 5GS (i.e. NG-RAN) for an event related to the criteria value of the criteria type, UE first checks the broadcasted system information and understands whether access to the event related to the criteria value of the criteria type is barred or not. When the UE understands that it is not barred, the UE initiates the procedure to access the network for the event corresponding to the category value of the category type. That is, the UE initiates the RRC connection establishment procedure for the event. After establishing the RRC connection successfully, the NAS message is transmitted to the 5GS (i.e. 5GC).

In one example based, the UE maps the criteria value of the criteria type of the event to the operator-defined access category number according the operator-defined access category definition sent to the UE in step 0-1, reads broadcasted system information (e.g. SIB 1) containing access barring information related to the operator-defined access category number and understands if the access for the operator-defined access category number is barred or not. If the access for the operator-defined access category number is not barred then the UE accesses to the 5GS (i.e. NG-RAN).

9-1. The UE shall perform the same procedure as described in step 8-1 whenever the UE needs to access the 5GS (i.e. NG-RAN).

In one example, the criteria type is S-NSSAI+DNN, i.e. both S-NSSAI and DNN together. For this criteria type, the 8 bits value is assigned e.g. 00000100.

In one example, the criteria Type is S-NSSAI and the criteria value is Slice Type only i.e. not SD.

In one example, the UE and the networks support the maximum number of the operator defined access category number higher than 32. The UE includes its capability of the maximum number of the operator defined access category number supported, i.e. whether the UE supports up to 32 operator defined access category numbers or higher than 32 operator-defined access category numbers in a NAS message, for example, during the Registration procedure in the Registration Request message or the Configuration Update Command message or other existing NAS message or in a new NAS message to the 5GS (i.e. 5GC). Upon receiving the capability of supporting the maximum operator-defined access category number, the 5GS understands if the UE support more than 32 operator-defined access category numbers. If the 5GS (i.e. 5GC) understands that the UE supports more than 32 operator defined access category numbers then the 5GS (i.e. 5GC), if it supports the maximum number of operator defined access category number higher than 32, may send to UE operator defined access category number higher than 32 in the operator defined access category definition. The 5GS (i.e. NG-RAN) may also broadcast unified access barring information for more than 32 operator-defined access category numbers. In one example, the maximum number of operator defined access category number is $2^2$. In a case the UE cannot comprehend extended operator-defined access categories, the UE may initiate an access request. In this case, an AS level congestion control mechanism or a NAS level congestion control mechanism bars UE's access attempt. In the UAC, the AS level congestion control and the NAS level congestion control may work all together supplementing each other to realize holistic system level access control.

In one example, the 5GC as shown in FIG. 1 can be the NWDAF.

The criteria type, criteria value and the operator define access category number are defined in the 3GPP TS 24.501 (NPL4).

In one example, the 5GS configure the UE with the following ODACD.

Access Category number 32
Criteria Type 00000011: S-NSSAI
Value of Criteria type: eMBB=1.

In one example, in steps 3-1 and 7-1, the broadcast information corresponding the category value of the category type consists of the operator defined access category number associated with the category value of the category type and the information element indicating whether the access to the access category number is barred or not In one example, in steps 3-1 and 7-1, the broadcast information corresponding the category value of the category type consists of the category type and the category value and the information element indicating whether the access to the category value of the category type is barred or not.

FIG. 10 shows information elements related to the category value of the category type. In one example, in steps 3-1 and 7-1, the information elements shown in FIG. 10 is broadcasted in SIB 1 as defined in the 3GPP TS 38.331 (NPL5).

Second Aspect (Solution 2 to Solve the Problem Statement 4)

When a USIM is changed in the UE, the UE categorizes an access attempt to the 5GS based on standardized access categories and a previously received ODACD of a PLMN for the old USIM until it receives a new ODACD from the PLMN for the new USIM.

The outline of the solution is given below.

A UE is registered to a PLMN for the first USIM and has received an ODACD. The UE associates an access category for a NAS event to a standardized access category or an operator defined access category.

Another USIM is selected in the UE and the UE performs a registration procedure successfully to the PLMN.

The UE uses the ODACD received for the first USIM until it receives the second ODACD for the second USIM or the standardized access category to associate the access category for a NAS event.

Figure 2:
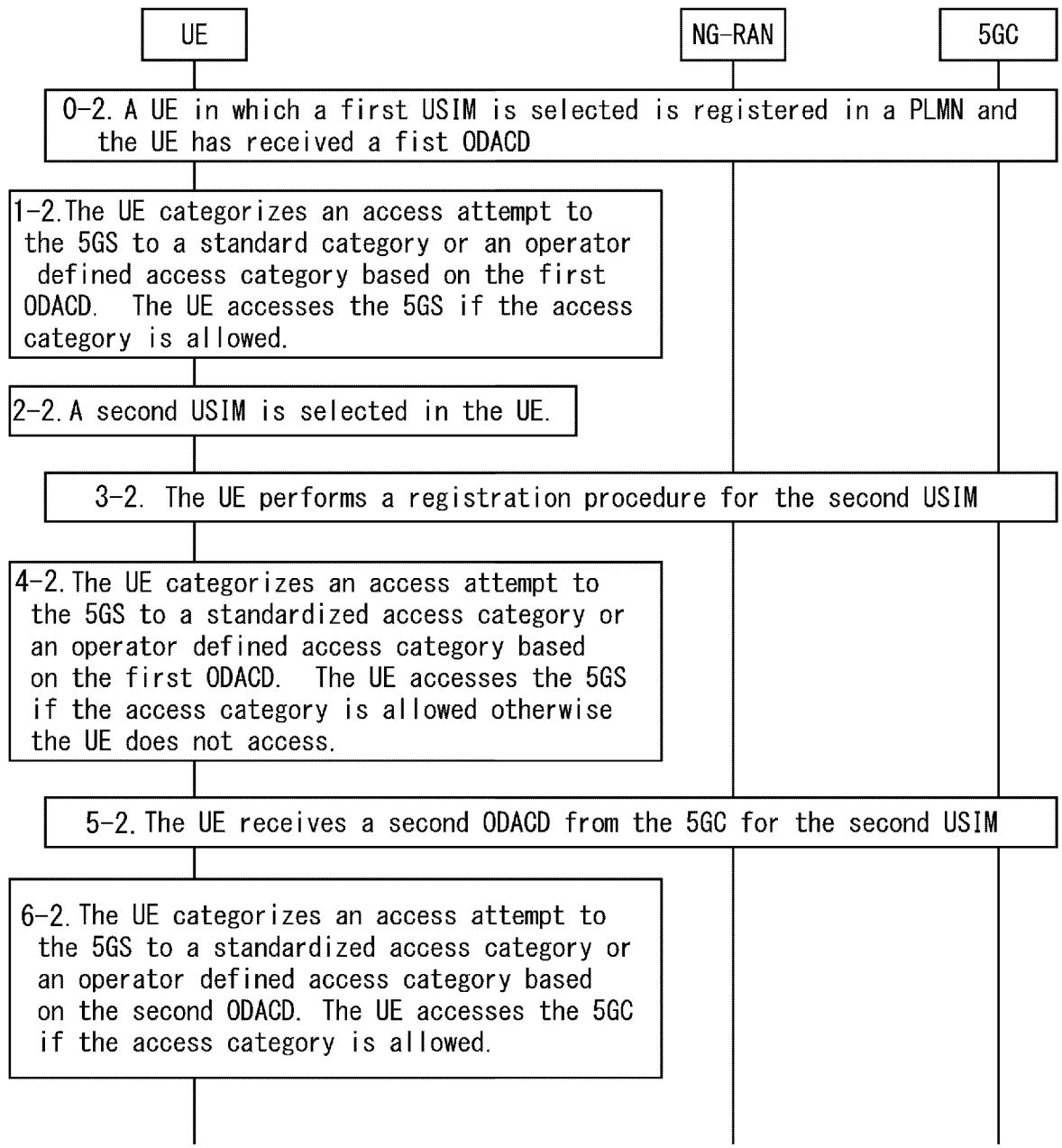
FIG. 2 is a flow chart showing a signalling flow of a method according to a second aspect of the present disclosure.

FIG. 2 shows a signalling flow of a method according to a second aspect of the present disclosure. The detailed steps of the solution 2 are described below.

0-2. A UE have a first USIM selected and is registered to an AMF of a PLMN.

The UE has received a first ODACD from the AMF.

1-2. The UE uses the standardized access categories and the operator defined access category as received in the ODACD for the access control to the 5GS when the UE accesses the 5GS (i.e. NG-RAN or 5GC) for a NAS event (e.g. a request from an upper layer or a NAS generated Request or a network initiated NAS procedure).

2-2. A second USIM is selected in the UE. More specifically, the USIM in the UE is changed from the first USIM to the second USIM.

3-2. The UE having the second USIM performs a registration procedure to the AMF (i.e. the PLMN) successfully.

4-2. When the NAS event is triggered in the UE to access the 5GS (e.g. NG-RAN), the UE categorizes the access attempt to an access category according to the standardized access categories only as mentioned in another aspect and the first ODACD. The UE evaluates, based on the access category of the access attempt and the access identity associated with the access attempt, whether the access to this access attempt is barred or not.

5-2. The UE receives a second ODACD from the AMF (i.e. the PLMN) in the second NAS message.

6-2. When an event is triggered in the UE to access the 5GS (e.g. NG-RAN), the UE categorizes the access attempt to an access category according to the standardized access categories and the second ODACD. The UE evaluates if the access to this access attempt is barred or allowed based on the access category and the access identity associated with the access attempt.

In one example, a second USIM is selected when the UE selects a second USIM of the same UICC.

In one example, a second USIM is selected when the user removes the first UICC containing the first USIM and inserts the second UICC containing the second USIM.

In one example, a second USIM is selected when the user switches the USIM from one to another in a case the UE supports DSDS (Dual SIM Dual Standby).

In one example, the change of the second USIM may be occurred during the UE is switched on or off.

In one example a NAS event is a request from an upper layer (Operating System (OS), applications on top of the OS, or a protocol stack on top of the 5GMM layer (e.g. Short Message Service (SMS), IP Multimedia Subsystem (IMS), Supplementary Services (SS), LoCation Services (LCS) etc.).

In one example, the event is the event generated by the 5GMM itself, e.g. a periodic registration procedure, event due to reception of a NAS or AS message from the 5GS.

Third Aspect (Solution 3 to Solve the Problem Statement 4)

When another USIM is selected in the UE, the UE does not use the old ODACD of the previous USIM.

The outline of the solution is given below.

A UE is registered to an AMF of a PLMN for a first USIM and has received a first ODACD from the AMF. The UE associates an access category for a NAS event to a standardized access category or an operator defined access category according to the first ODACD.

Another USIM is selected in the UE and the UE having another USIM performs registration a procedure successfully to the PLMN.

The UE uses the standardized access category only to associate the access category for a NAS event. The UE does not use the first ODACD received for the first USIM. When the UE receives a second ODACD for the second USIM, the UE associates a NAS event to the standardized access category or an operator defined access category according to the second ODACD.

Figure 3:
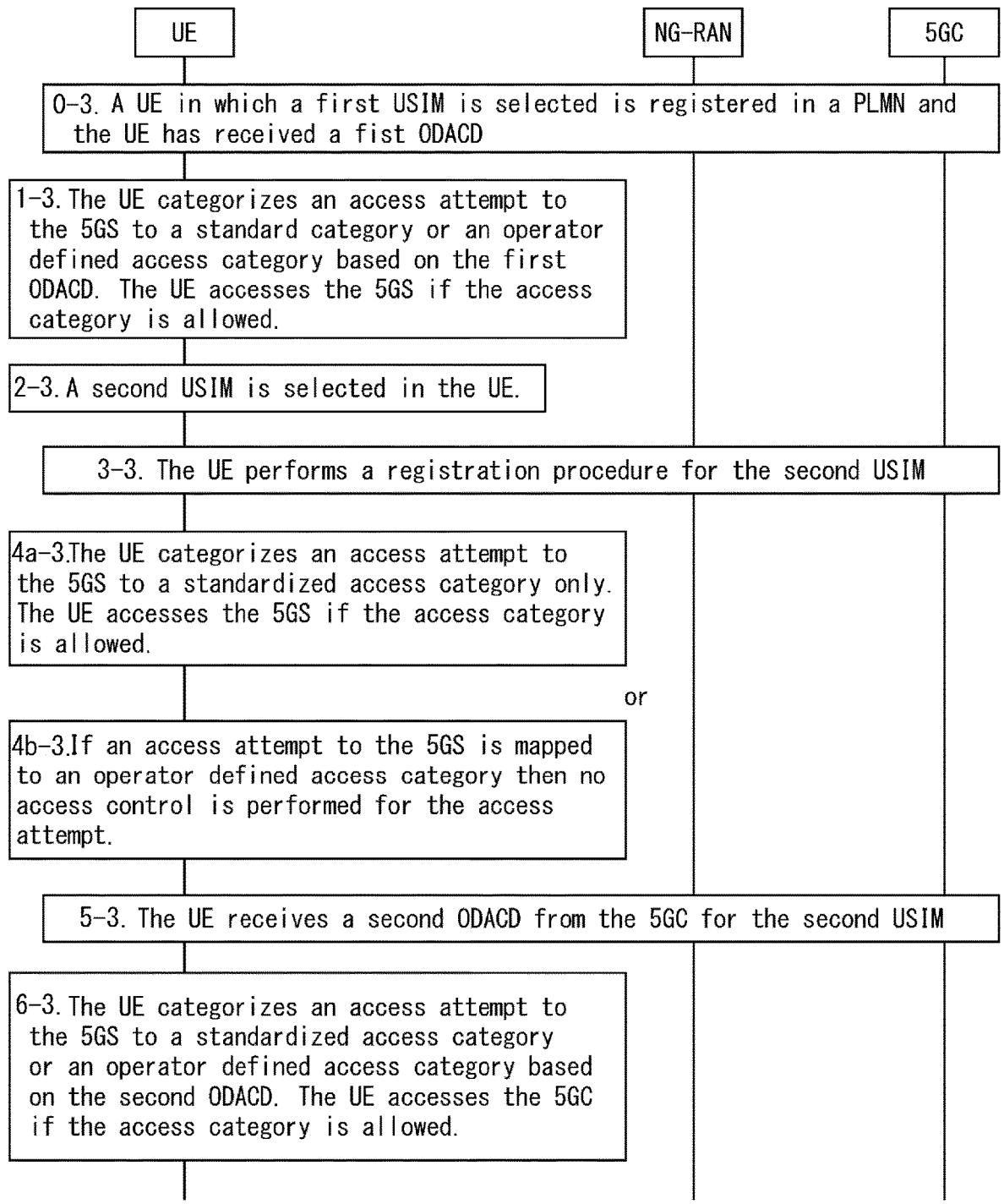
FIG. 3 is a flow chart showing a signalling flow of a method according to a third aspect of the present disclosure.

FIG. 3 shows a signalling flow of a method according to a third aspect of the present disclosure. The detailed steps of the solution 3 are described below.

0-3. A UE have a first USIM selected and is registered to an AMF of a PLMN. The UE has received a first ODACD from the AMF.

1-3. The UE uses the standardized access category and the first ODACD for the access control when the UE accesses the 5GS (i.e. NG-RAN or 5GC) for a NAS event.

2-3. A second USIM is selected in the UE. Upon selecting the second USIM, the UE deletes the first ODACD.

3-3. The UE having the second USIM performs a registration procedure to a second AMF of a second PLMN for the second USIM.

The UE follows either step 4a-3 or 4b-3.

4a-4. When an event is triggered in the UE to access the 5GS (e.g. NG-RAN), the UE categorizes the access attempt to an access category according to the standardized access categories only as per the rule defined in another aspect as described later. The UE evaluates, based on the access category of the access attempt and the access identity associated with the access attempt, whether the access to this access attempt is barred or not.

4b-4. When an event is triggered in the UE to access the 5GS (e.g. NG-RAN) and the access attempt is categorized to a criteria type (e.g. S-NSSAI or DNN, or OS-ID+APP ID or 5QI or S-NSSAI+DNN), the UE does not perform an access control for the access category. The UE accesses the 5GS (e.g. NG-RAN) without performing the access control.

5-3. The UE received the second ODACD in the second NAS message.

6-3. When an event is triggered in the UE to access the 5GS (e.g. NG-RAN), the UE categorizes the access attempt to an access category according to the standardized access categories and the second ODACD. The UE evaluates whether the access to this access attempt is barred or not based on the access category of the access attempt and the access identity associated with the access attempt.

In one example, a second USIM is selected when the UE selects a second USIM of the same UICC.

In one example, a second USIM is selected when the user removes the first UICC containing the first USIM and inserts the second UICC containing the second USIM.

In one example, the change of the second USIM may be occurred during the UE is switched on or off.

In one example for the solutions 2 and 3, when the USIM is changed in a UE from a first USIM having IMSI 1 to a second USIM having IMSI 2 and IMSI 1 and IMSI 2 are different from each other, the UE sends an information element in a NAS message (e.g. a REGISTRATION REQUEST message or any existing NAS message or a new NAS message) to a network (e.g. AMF) indicating that the IMSI is changed in the UE. When the network receives the information element indicating that the IMSI is changed in the UE, the network (e.g AMF) sends an ODACD corresponding to the new IMSI to the UE. The UE will follow the procedure as described in the solutions 2 and 3 when the UE receives the ODACD from the network. Alternatively, in this scenario, the UE indicates to the network that the UE does not have an ODACD for the IMSI and the network, when receiving the indication, sends the ODACD for the IMSI.

In one example for the solutions 2 and 3, when a UICC containing a USIM is inserted first time in the UE, the UE sends an information element in a NAS message (e.g. a REGISTRATION REQUEST message or any existing NAS message or a new NAS message) to a network (e.g. AMF) indicating that the USIM is inserted for the first time. When the network receives the information element indicating that the USIM is inserted for the first time, the network (e.g AMF) sends an ODACD corresponding to the new IMSI to the UE. The UE will follow the procedure as described in the solutions 2 and 3 when the UE receives the ODACD from the network. The UE makes an entry in the memory for a UICC containing an USIM when the UICC is inserted in the UE. In one example, the entry is based on the IMSI of the USIM. In one case in this scenario, the UE has an ODACD of the selected PLMN for another USIM (another IMSI). Alternatively, in this scenario, the UE indicates, to the network, that the UE does not have an ODACD for the IMSI and the network, when receiving the indication, sends the ODACD for the IMSI.

In one example, when the UE performs a registration procedure to a network (e.g. AMF) or after the registration procedure is completed successfully, the AMF sends a NAS message (e.g. CONFIGURATION UPDATE COMMAND, or any existing NAS message or a new NAS message) requesting the UE to send a current ODACD to the network. Upon receiving the NAS message, the UE sends the current ODACD to the network in a NAS message (CONFIGURATION UPDATE COMPLETE). When the network checks that the current ODACD received from the UE is not the latest ODACD of the UE, the network sends the latest ODACD to the UE in a NAS message (e.g. CONFIGURATION UPDATE COMMAND, or any existing NAS message or a new NAS message). The UE will use the latest ODACD as per the procedure defined in the solutions 2 and 3.

In one example, if the network detects that a UICC containing a USIM (IMSI) is inserted in a new UE (different IMEI) then the network sends the ODACD of the IMSI to the new IMSI in a NAS message (e.g. CONFIGURATION UPDATE COMMAND, or any existing NAS message or a new NAS message). The network keeps a record of association of the IMSI and the IMEI when the UE registers to the network for an IMSI.

Forth aspect (Solution 4 to solve problem statement 5) The UE ignores the ODACD when the ODACD is received without integrity protected.

Figure 4:
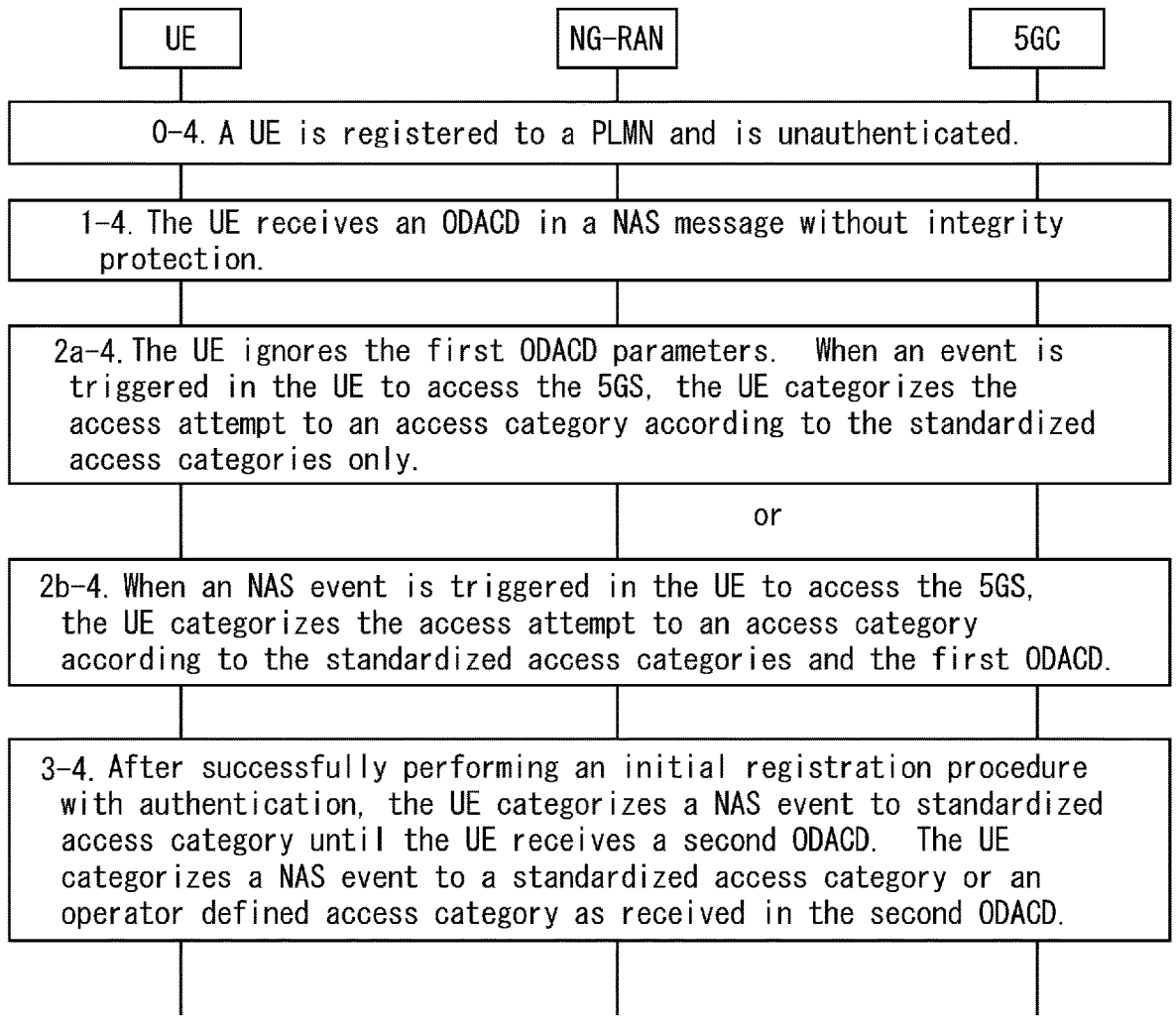
FIG. 4 is a flow chart showing a signalling flow of a method according to a forth aspect of the present disclosure.

FIG. 4 shows a signalling flow of a method according to a forth aspect of the present disclosure. The detailed steps of the solution 4 are described below.

0-4. A UE is registered to an AMF of a PLMN and is unauthenticated. That is, either an authentication procedure fails and EIA 0 (Null Integrity) is activated in the UE or an authentication procedure is not initiated (e.g. the UE has no UICC or SIM, or adds the SA3 text due to 4G to 5G and no 5G subscription).

1-4. The UE receives a first ODACD in a NAS message from the 5GC and the NAS message is not integrity protected. This ODACD is sent during the registration procedure in step 1-4 or after the registration procedure in step 1-4.

The UE performs either step 2a-4 or 2b-4.

2a-4. The UE ignores the first ODACD parameters. When a NAS event is triggered in the UE to access the 5GS (e.g. NG-RAN), the UE categorizes the access attempt to an access category according to the standardized access categories only as per the rule defined in another aspect as described later. The UE evaluates whether the access to this access attempt is barred or allowed based on the access category associated with the access attempt.

2b-4. when a NAS event is triggered in the UE to access the 5GS (e.g. NG-RAN), the UE categorizes the access attempt to an access category according to the standardized access categories and the first ODACD as per the rule defined in Another aspect as described later. The UE evaluates whether the access to this access attempt is barred or not based on the access category of the access attempt and the access identity associated with the access attempt. The UE follows this procedure as long as the UE is unauthenticated.

3-4. After performing the initial registration procedure with the authentication procedure successfully, the UE ignores the first ODACD and uses only standard access categories to categorize an access attempt until the UE receives a second ODACD. After receiving the second ODACD, the UE categorizes a NAS event to a standardized access category or an operator defined access category as received in the second ODACD.

Fifth Aspect (Solution 5 to Solve the Problem Statement 6)

The UAC to those of UEs that has registered to the same AMF for both 3GPP access and a non-3GPP access is described in a firth aspect of the present disclosure.

Figure 5:
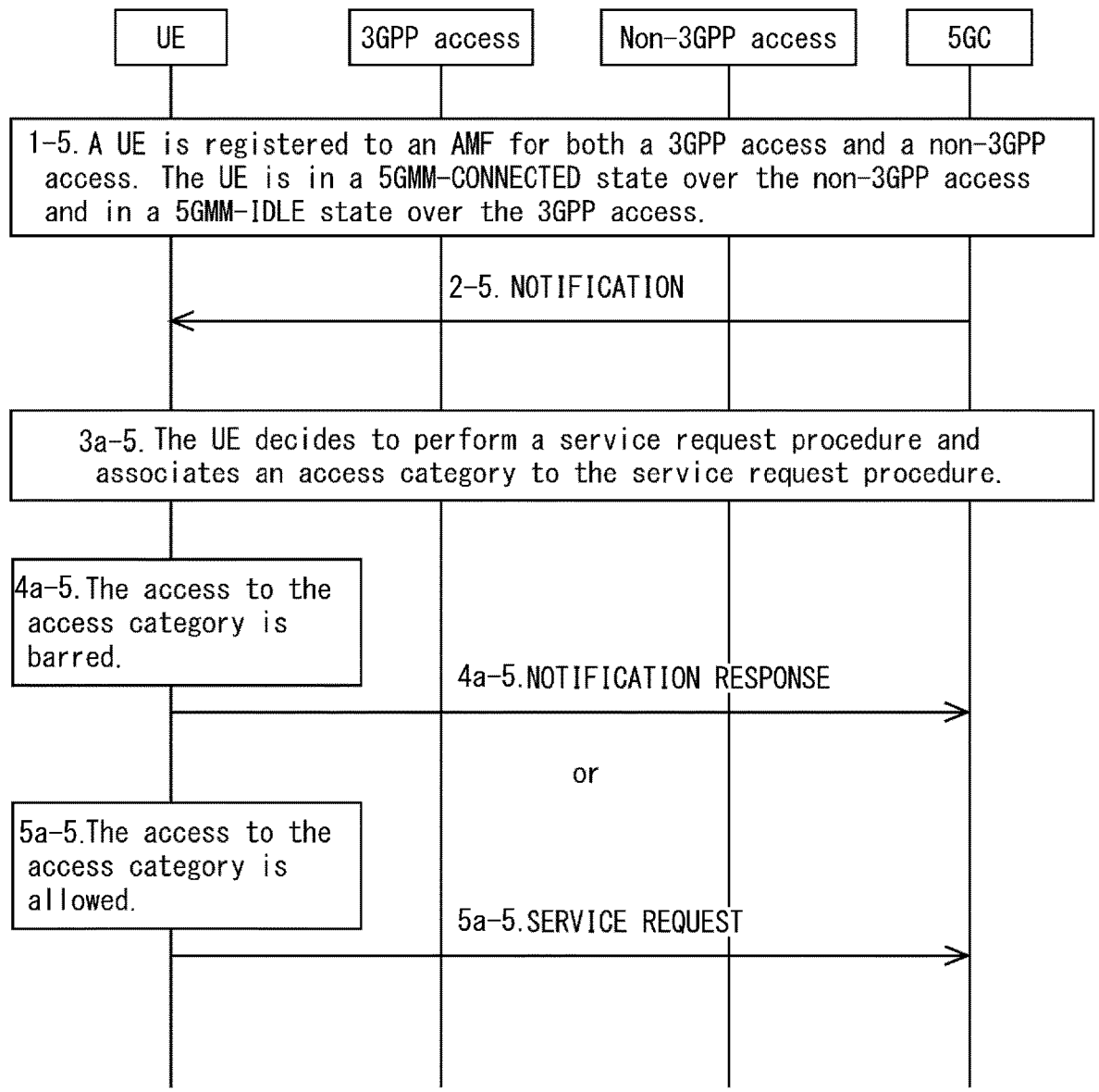
FIG. 5 is a flow chart showing a signalling flow of a method according to a fifth aspect of the present disclosure.
Figure 6:
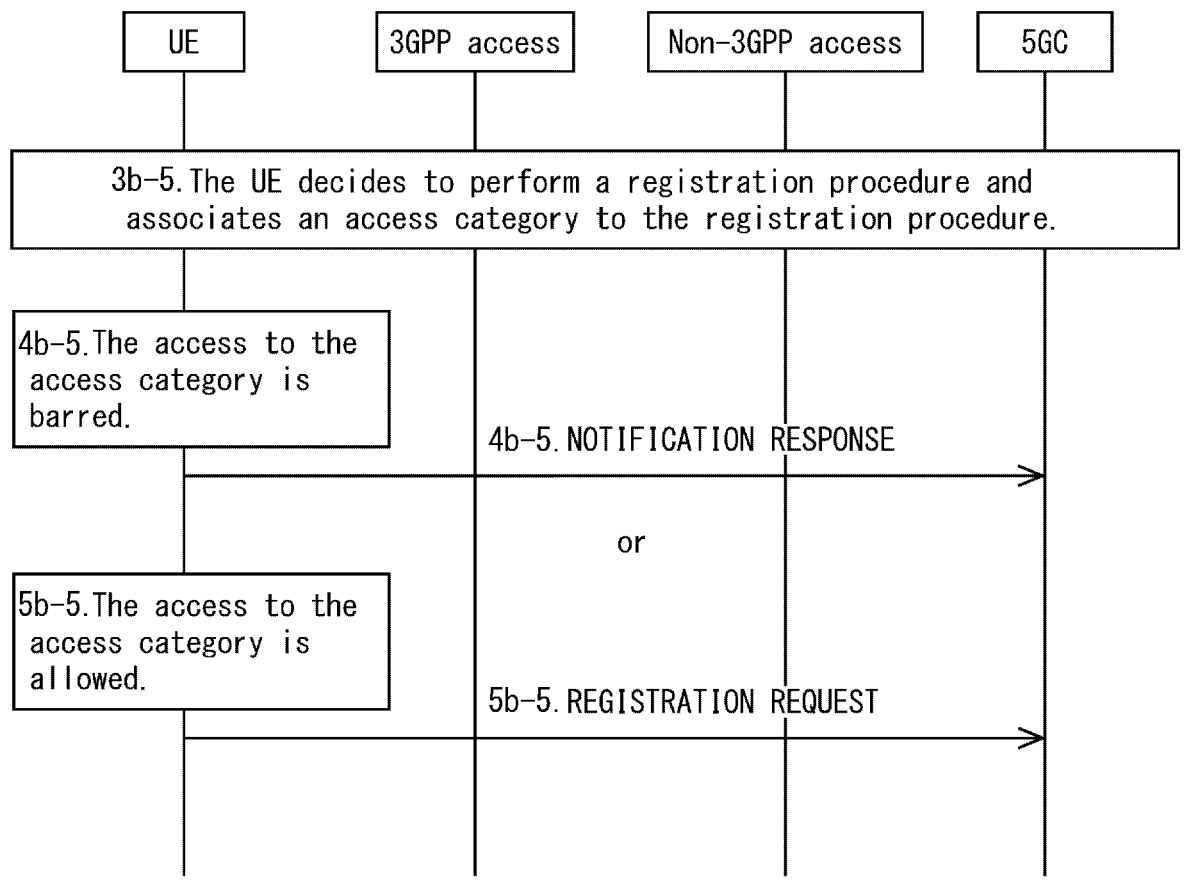
FIG. 6 is a flow chart showing a signalling flow of a method according to a fifth aspect of the present disclosure.

FIGS. 5 and 6 show a signalling flow of a method according to a fifth aspect of the present disclosure. The detailed steps of the solution 5 are described below.

1-5. A UE is registered to a same AMF over a 3GPP access and a non-3GPP access. The UE has received an ODACD from the AMF. In this step, the UE is in a 5GMM-CONNECTED state over non-3GPP access and in a 5GMM-IDLE state over 3GPP access.

2-5. The UE receives the NOTIFICATION message from the AMF over the non-3GPP access. Upon receiving the NOTIFICATION message, the UE performs one of the following sequence of steps:
i) steps 3a-5 and 4a-5 in FIG. 5
ii) steps 3a-5 and 5a-5 in FIG. 5
iii) steps 3b-5 and 4b-5 in FIG. 6
iv) steps 3b-5 and 5b-5 in FIG. 6

3a-5. The UE decides to perform a service request procedure and the UE associates one of the following access categories to the service request procedure.

Access category:
i) MT_acc=0
ii) MO_data=7
iii) a new access category

Mapping tables for the access category are mentioned in another aspect as described later.

In one example, the new access category is a standardized access category. That is, the new access category is applicable in all PLMNs and have the same function in all PLMNs.

In one example, a new RRC establishment cause is assigned for the new access category. The UE and the network treat this new RRC establishment cause differently than the existing RRC establishment cause.

In one example, the gNB gives the highest priority to setup the RRC connection for the RRC setup Request message containing the new RRC establishment cause associated with the new access category.

In one example, the gNB gives identical or lower priority than the establishment cause MT access to setup the RRC connection for the RRC setup Request message containing the new RRC establishment cause associated with the new access category.

The UE chooses a RRC establishment cause for a RRC setup Request message for the gNB as per the mapping between access categories/access identities in another aspect as described later.

The UE checks whether the access attempt for the access category is barred or allowed. The UE performs one of the steps 4a-5 and 5a-5 depending on whether the access attempt is barred or allowed.

4a-5. If the access attempt for the access category is barred then the UE sends the NOTIFICATION RESPONSE message to the 5GC (i.e. AMF). The UE does not initiate the Service Request procedure to re-establish the user plane for the PDU session(s) associated with the 3GPP access.

5a-5. If the access attempt for the access category is not barred then the UE sends the RRC Setup Request to the gNB containing the establishment cause as described in step 3a-5. After establishment of the RRC connection, the UE transmits the SERVICE REQUEST message.

3b-5. The UE decides to perform a registration procedure and the UE associate one of the following access categories to the registration procedure.

Access Category:
i) MT_acc=0,
ii) MO_sig=3,
iii) a new access category.

The new access category is defined in step 3a-5. The UE and the network follow the procedure for this new access category as defined in step 3a-5. The UE executes either of step 4b-5 or 5b-5.

The UE chooses a RRC establishment cause for a RRC setup Request message for the gNB as per the mapping between access categories/access identities in another aspect as described later.

4b.-5 If the access category is barred then the UE sends the NOTIFICATION RESPONSE message.

5b-5. If the access attempt for the access category is not barred then the UE sends the RRC Connection to the NG-RAN with the RRC Connection Request containing the cause associated with the access category selected in step 3a-5.

After the establishment of the RRC connection, the UE transmits the REGISTRATION REQUEST message.

In one example, when the UE is in a CM-CONNECTED mode over 3GPP access and in a CM-IDLE state over non-3GPP access and the UE receives a NOTIFICATION message over 3GPP access to establish the user plane over the 3GPP access for a PDU session(s) associated with the non-3GPP access, the UE will initiates the service request procedure. The UE associates the service request procedure to one of the access categories defined in the step 3a-5. IF the access for the access category is not barred then the UE sends a Service Request message containing the list of the PDU session (s) associated with the non-3GPP access for which establishment of the user plane is allowed over the 3GPP access.

In one example, the above steps are applicable for the 5GS including the ng-eNB and the 5GC. In this case, the UE sends the RRC Connection Request with establishment cause as described above.

Another Aspect

The previously mentioned ODACD may include following parameters:

a) a precedence value which indicates order in which the UE shall evaluate the operator-defined category definition for a match;
b) an operator-defined access category number, i.e. access category number in the 32-63 range that uniquely identifies the access category in the PLMN in which the access categories are being sent to the UE; and
c) one or more access category criteria type and associated access category criteria type values. The access category criteria type can be set to one of the following:
1) DNN name;
2) 5QI;
3) OS Id+OS App Id of application triggering the access attempt; or
4) S-NSSAI; and
d) optionally, a standardized access category, that is used in combination with the access identities to determine the establishment cause.

Here, each operator-defined access category definition may have a different precedence value. Several operator-defined access category definitions can have the same operator-defined access category number.

In one example, upon receiving a NAS signalling message with one or more operator-defined access category definitions, the UE shall store the operator-defined access category definitions for the registered PLMN.

In one example, upon receiving a NAS signalling message with zero operator-defined access category definitions, the UE shall delete the operator-defined access category definitions stored for the registered PLMN.

In one example, when the UE is switched off, the UE shall keep the operator-defined access category definitions so that the operator-defined access category definitions can be used after switch on.

In one example, when the UE selects a new PLMN which is not equivalent to the previously selected PLMN, the UE shall stop using the operator-defined access category definitions configured for the previously selected PLMN and should keep the operator-defined access category definitions configured for the previously selected PLMN.

Any NAS messages mentioned above may be transmitted between the UE and AMF via a NG-RAN node (e.g., gNB or ng-eNB).

Furthermore, a part of sequences, procedures or messages mentioned above may be not always needed for identifying one or more inventions.

The table 1 is the mapping table of the access category as described the above. Furthermore, the rule as described the above is the Rule #(Rule 1~10) in the Table 2.

TABLE 1

Mapping table for access categories

| Rule # | Type of access attempt | Requirements to be met | Access Category |
|---|---|---|---|
| 1 | Response to paging; 5GMM connection management procedure initiated for the purpose of transporting an LPP message | Access attempt is for MT access | 0 (=MT_acc) |
| 2 | Emergency | UE is attempting access for an emergency session (NOTE 1, NOTE 2) | 2 (=emergency) |
| 3 | Access attempt for operator-defined access category | UE was provided with operator-defined access category definitions for the current PLMN as specified in subclause 4.5.3, and access attempt is matching criteria of an operator-defined access category definition | 32-63 (=based on operator classification) |
| 4 | Access attempt for delay tolerant service | (a) UE is configured for NAS signalling low priority or UE supporting S1 mode is configured for EAB (see the "ExtendedAccassBarring" leaf of NAS configuration MO in 3GPP TS 24.368 or 3GPP TS 31.102 where "EAB override" does not apply, and (b). the PLMN is broadcasting one of the categories a, b or c, and the UE is a member of the broadcasted category in the selected PLMN or RPLMN/equivalent PLMN (NOTE 3, NOTE 5, NOTE 6, NOTE 7) | 1 (=delay tolerant) |
| 5 | MO MMTel voice call | Access attempt is for MO MMTel voice call or for NAS signalling connection recovery during ongoing MO MMTel voice call (NOTE 2) | 4 (=MO MMTel voice) |
| 6 | MO MMTel video call | Access attempt is for MO MMTel video call or for NAS signalling connection recovery during ongoing MO MMTel video call (NOTE 2) | 5 (=MO MMTel video) |

TABLE 1-continued

Mapping table for access categories

| Rule # | Type of access attempt | Requirements to be met | Access Category |
|---|---|---|---|
| 7 | MO SMS over NAS or MO SMSoIP | Access attempt is for MO SMS over NAS (NOTE 4) or MO SMS over SMSoIP transfer or for NAS signalling connection recovery during ongoing MO SMS or SMSoIP transfer (NOTE 2) | 6 (=MO SMS and SMSoIP) |
| 8 | UE NAS initiated 5GMM specific procedures | Access attempt is for MO signalling | 3 (=MO_sig) |
| 9 | UE NAS initiated 5GMM connection management procedure or 5GMM NAS transport procedure | Access attempt is for MO data | 7 (=MO_data) |
| 10 | An uplink user data packet is to be sent for a PDU session with suspended user-plane resources | No further requirement is to be met | 7 (=MO_data) |

(NOTE 1):
This includes 5GMM specific procedures while the service is ongoing and 5GMM connection management procedures required to establish a PDU session with request type = "initial emergency request" or "existing emergency PDU session", or to re-establish user-plane resources for such a PDU session.

NOTE 1: This includes 5GMM specific procedures while the service is ongoing and 5GMM connection management procedures required to establish a PDU session with request type="initial emergency request" or "existing emergency PDU session", or to re-establish user-plane resources for such a PDU session. This further includes the service request procedure initiated with a SERVICE REQUEST message with the Service type IE set to "emergency services fallback".

NOTE 2: Access for the purpose of NAS signalling connection recovery during an ongoing service, or access for the purpose of NAS signalling connection establishment following fallback indication from lower layers during an ongoing service, is mapped to the access category of the ongoing service in order to derive an RRC establishment cause, but barring checks will be skipped for this access attempt.

NOTE 3: If the UE selects a new PLMN, then the selected PLMN is used to check the membership; otherwise the UE uses the RLPMN or a PLMN equivalent to the RPLMN.

NOTE 4: This includes the 5GMM connection management procedures triggered by the UE-initiated NAS transport procedure for transporting the MO SMS.

NOTE 5: The UE configured for NAS signalling low priority is not supported in this release of specification. If a UE supporting both the S1 mode and the N1 mode is configured for NAS signalling low priority in the S1 mode as specified in 3GPP TS 24.368 or 3GPP TS 31.102, the UE shall ignore the configuration for NAS signalling low priority when in the N1 mode.

NOTE 6: If the access category applicable for the access attempt is 1, then the UE shall additionally determine a second access category from the range 3 to 7.

If more than one access categories match, the access category of the lowest rule number shall be chosen. The UE shall use the second access category only to derive an RRC establishment cause for the access attempt.

NOTE 7: "EAB override" does not apply, if the UE is not configured to allow overriding EAB (see the "Override_ExtendedAccessBarring" leaf of NAS configuration MO in 3GPP TS 24.368 [17] or 3GPP TS 31.102 [22]), or if NAS has not received an indication from the upper layers to override EAB and the UE does not have a PDU session that was established with EAB override.

TABLE 2

Mapping table for access identities/access categories and RRC establishment cause

| Access identities | Access categories | RRC establishment cause is set to |
|---|---|---|
| 0 | 0 (=MT_acc) | MT access |
|  | 1 (=delay tolerant) | Not applicable (NOTE 1) |
|  | 2 (=emergency) | Emergency call |
|  | 3 (=MO_sig) | MO signalling |
|  | 4 (=MO MMTel voice) | MO voice call |
|  | 5 (=MO MMTel video) | FFS |
|  | 6 (=MO SMS and SMSoIP) | FFS |
|  | 7 (=MO_data) | MO data |
| 1 | Any category | High priority access |
| 2 | Any category | High priority access |
| 11, 15 | Any category | High priority access |
| 12, 13, 14, | Any category | High priority access |

(NOTE 1):
A UE using access category 1 for the access barring check will determine a second access category in the range 3 to 7 that is to be used for determination of the RRC establishment cause. See subclause 4.5.2, table 4.5.2.2, NOTE 6.
NOTE 2:
See subclause 4.5.2, table 4.5.2.1 for use of the access identities of 0, 1, 2, and 11-15.

In one example, all solutions (aspects) are applicable to the 5GMM—IDLE mode or the 5GMM-CONNECTED Mode or the 5GMM-CONNECTED with RRC Inactive.

In one example, in all solutions(aspects), the UE performs registration to the first registered PLMN or an equivalent PLMN of the first registered PLMN or a different PLMN than first Registered PLMN when the UE performs the registration procedure second time to a PLMN.

In one example, in all solutions(aspects), the NAS event is a NAS procedure to access the 5GS (i.e. NG-RAN or 5GC).

In one example, in all solutions(aspects), the UE stores the ODACD per IMSI.

In one example, in all solutions (aspects), the IMSI is SUPI.

The User Equipment (or "UE", "mobile station", "mobile device" or "wireless device") in the present disclosure is an entity connected to a network via a wireless interface.

It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example, equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example, transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example, information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example, a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example, an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example, a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the Table 3 (source: 3GPP TS 22.368, Annex B, the contents of which are incorporated herein by reference). This list is not exhaustive and is intended to be indicative of some examples of machine type communication applications.

TABLE 3

Some examples of machine-type communication applications.

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ Control | Sensors |
| | Lighting |
| | Pumps |
| | Valves |
| | Elevator control |
| | Vending machine control |
| | Vehicle diagnostics |

TABLE 3-continued

Some examples of machine-type communication applications.

| Service Area | MTC applications |
| --- | --- |
| Metering | Power |
|  | Gas |
|  | Water |
|  | Heating |
|  | Grid control |
|  | Industrial metering |
| Consumer Devices | Digital photo frame |
|  | Digital camera |
|  | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary aspects described in the present disclosure. Needless to say, these technical ideas and aspects are not limited to the above-described UE and various modifications can be made thereto.

User Equipment (UE)

Figure 7:
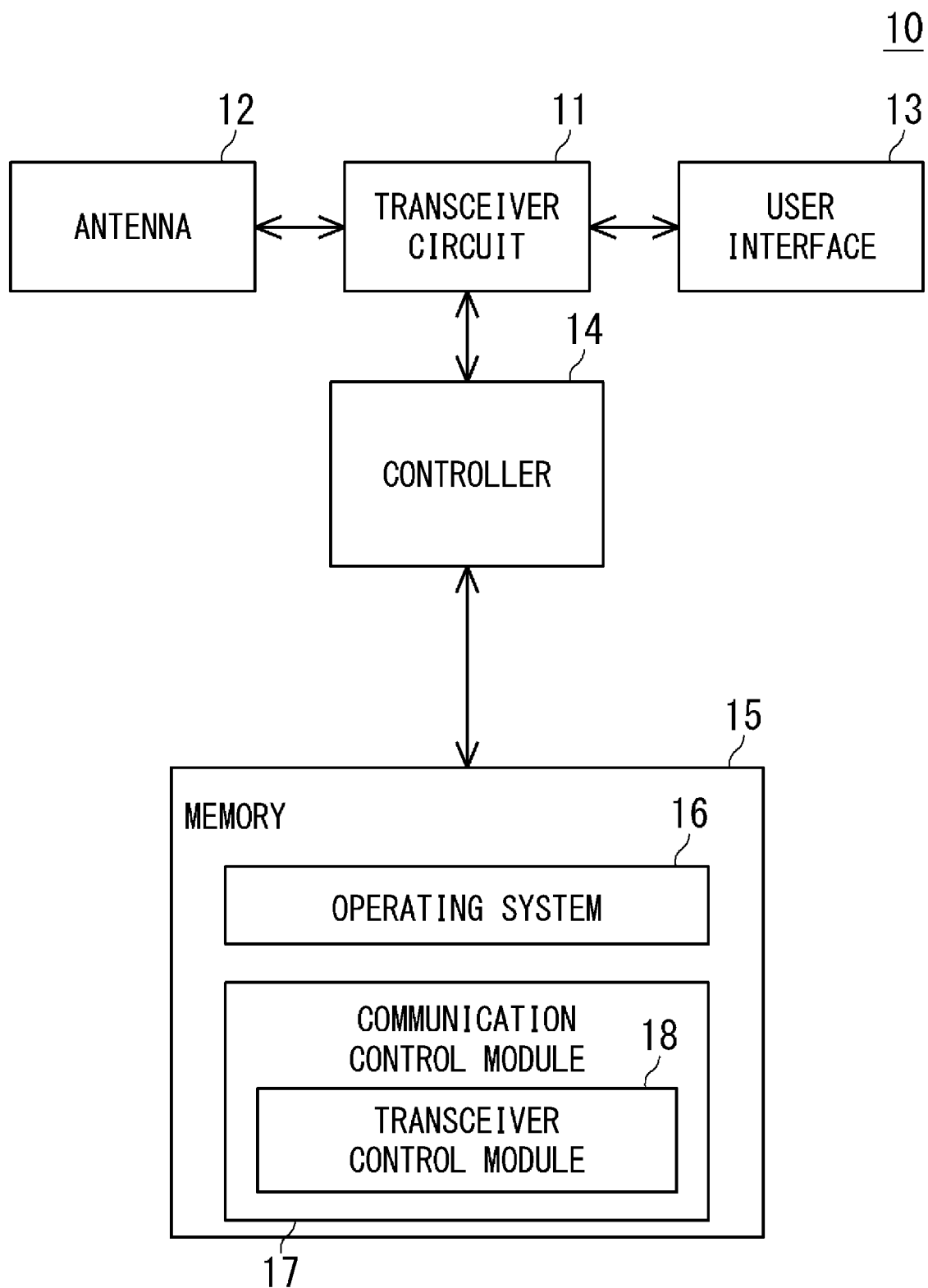
FIG. 7 is a block diagram showing a configuration example of a UE.

FIG. 7 shows main components of the UE. As shown, the UE 10 includes a transceiver circuit 11 which is operable to transmit signals to and to receive signals from the connected node(s) via one or more antenna 12. Although not necessarily shown in FIG. 7, the UE will of course have all the usual functionality of a conventional mobile device (such as a user interface 13) and this may be provided by any one or any combination of hardware, software and firmware, as appropriate. Software may be pre-installed in the memory and/or may be downloaded via the telecommunication network or from a removable data storage device (RMD), for example. It should be noted that each arrow indicated in the subsequent block diagrams represent an example of a flow of a signal or data, but it is not intended that the flow of the signal or data is limited in a specific direction.

A controller 14 controls the operation of the UE 10 in accordance with software stored in a memory 15. For example, the controller 14 may be realized by Central Processing Unit (CPU). The software includes, among other things, an operating system 16 and a communications control module 17 having at least a transceiver control module 18. The communications control module 17 (using its transceiver control sub-module) is responsible for handling (generating/sending/receiving) signalling and uplink/downlink data packets between the UE 10 and other nodes, such as the base station/(R)AN node, a MME, the AMF (and other core network nodes). Such signalling may include, for example, appropriately formatted signalling messages relating to connection establishment and maintenance (e.g. RRC messages), NAS messages such as periodic location update related messages (e.g. tracking area update, paging area updates, location area update) etc.

(R)AN Node

Figure 8:
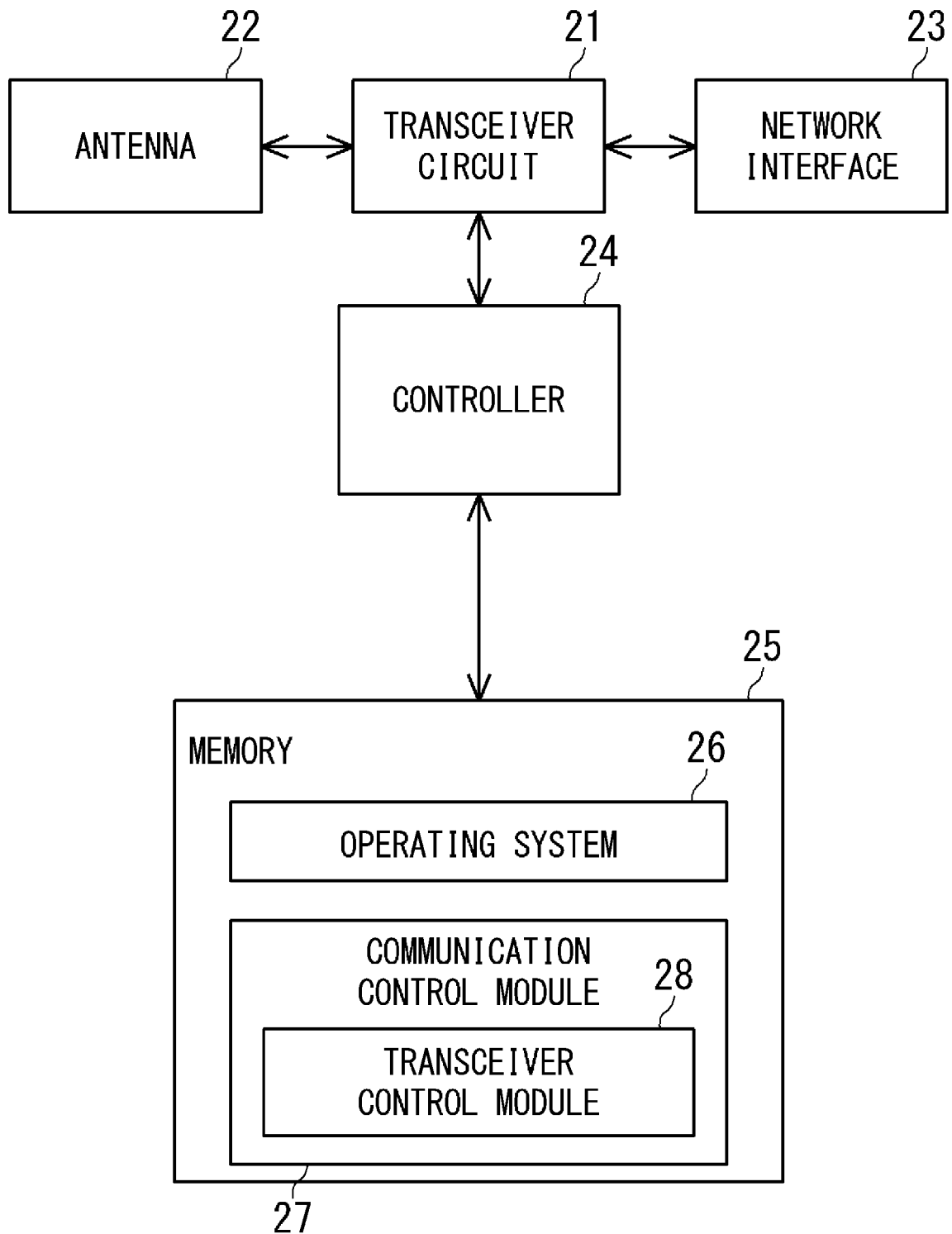
FIG. 8 is a block diagram showing a configuration example of a (R)AN.

FIG. 8 shows main components of an exemplary (R)AN node, for example a base station ('eNB' in LTE, 'gNB' in 5G). As shown, the (R)AN node 20 includes a transceiver circuit 21 which is operable to transmit signals to and to receive signals from connected UE(s) via one or more antenna 22 and to transmit signals to and to receive signals from other network nodes (either directly or indirectly) via a network interface 23. A controller 24 controls the operation of the (R)AN node 20 in accordance with software stored in a memory 25. For example, the controller 24 may be realized by Central Processing Unit (CPU). Software may be pre-installed in the memory 25 and/or may be downloaded via the telecommunication network or from a removable data storage device (RMD), for example. The software includes, among other things, an operating system 26 and a communications control module 27 having at least a transceiver control module 28.

The communications control module 27 (using its transceiver control sub-module) is responsible for handling (generating/sending/receiving) signalling between the (R)AN node 20 and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller 24 is also configured (by software or hardware) to handle related tasks such as, when implemented, UE mobility estimate and/or moving trajectory estimation.

AMF

Figure 9:
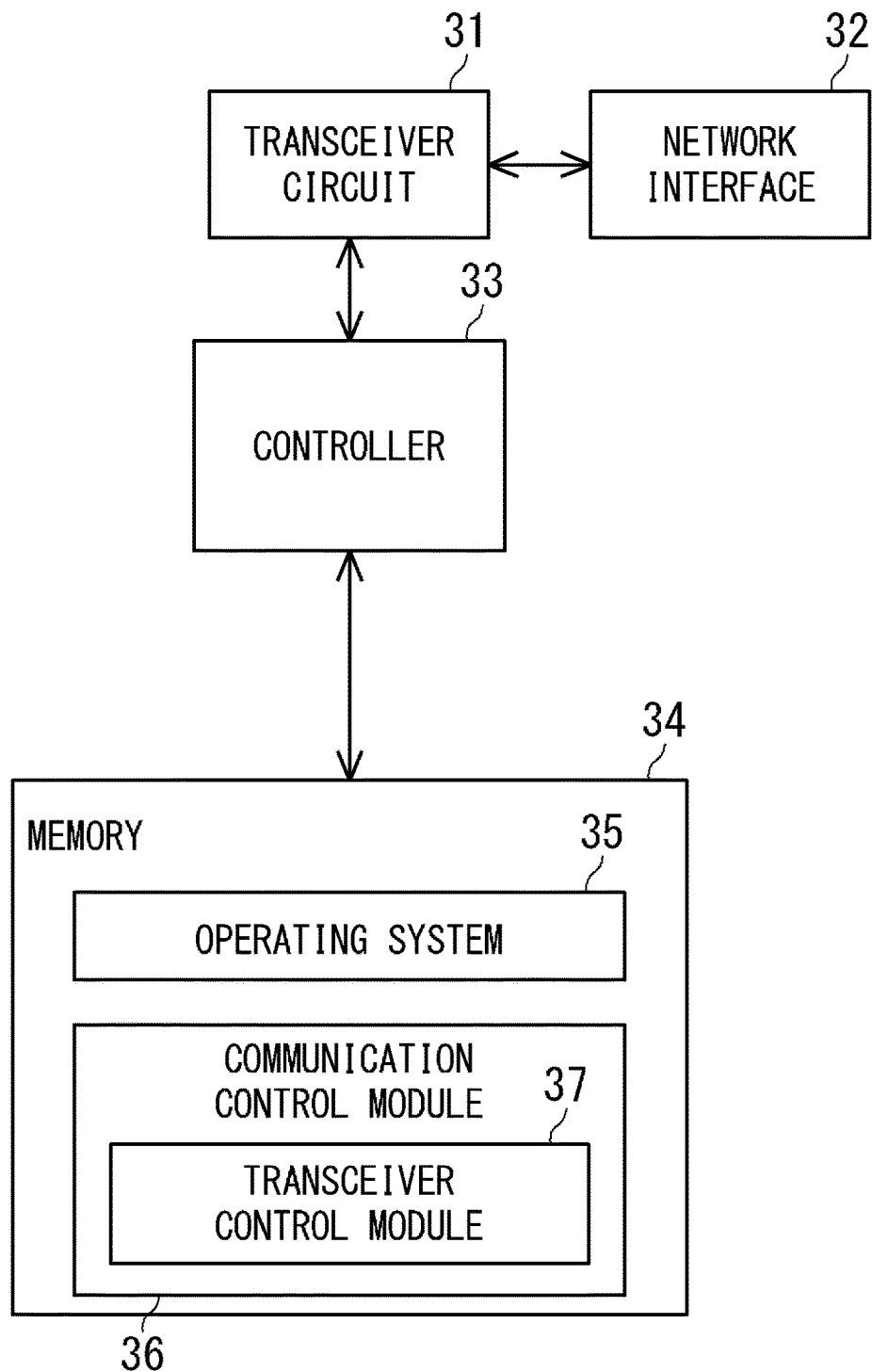
FIG. 9 is a block diagram showing a configuration example of an AMF.

FIG. 9 shows main components of the AMF. The AMF 30 is included in the 5GC. As shown, the AMF 30 includes a transceiver circuit 31 which is operable to transmit signals to and to receive signals from other nodes (including the UE) via a network interface 32. A controller 33 controls the operation of the AMF 30 in accordance with software stored in a memory 34. For example, the controller 33 may be realized by Central Processing Unit (CPU). Software may be pre-installed in the memory and/or may be downloaded via the telecommunication network or from a removable data storage device (RMD), for example. The software includes, among other things, an operating system 35 and a communications control module 36 having at least a transceiver control module 37.

The communications control module 37 (using its transceiver control sub-module) is responsible for handling (generating/sending/receiving) signalling between the AMF and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey a NAS message from and to the UE, etc.

The previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

This application is based upon and claims the benefit of priority from Indian patent applications No. 201811037573, filed on Oct. 4, 2018, the disclosure of which is incorporated herein in its entirety by reference.

REFERENCE SIGNS LIST

10 UE
11 TRANSCEIVER CIRCUIT
12 ANTENNA
13 USER INTERFACE
14 CONTROLLER
15 MEMORY
16 OPERATING SYSTEM
17 COMMUNICATIONS CONTROL MODULE
18 TRANSCEIVER CONTROL MODULE
20 (R)AN NODE
21 TRANSCEIVER CIRCUIT
22 ANTENNA
23 NETWORK INTERFACE
24 CONTROLLER
25 MEMORY
26 OPERATING SYSTEM
27 COMMUNICATIONS CONTROL MODULE
28 TRANSCEIVER CONTROL MODULE
30 AMF
31 TRANSCEIVER CIRCUIT
32 NETWORK INTERFACE
33 CONTROLLER
34 MEMORY
35 OPERATING SYSTEM
36 COMMUNICATIONS CONTROL MODULE
37 TRANSCEIVER CONTROL MODULE

What is claimed is:

1. A method of a user equipment (UE), the method comprising:
receiving, when the UE is in a connected mode over a non 3GPP access and in an idle mode over a 3GPP access, a NOTIFICATION message from a core network node of over the non 3GPP access;
determining, when performing a service request procedure, MT_acc=0 as an access category to be associated with the service request procedure upon receiving the NOTIFICATION message;
checking whether an access attempt for the access category is barred or allowed; and
sending, when the access category is allowed, a Radio Resource Control (RRC) connection setup request to a base station and transmitting, to the core network node, a SERVICE REQUEST message after an RRC connection is established.

2. The method according to claim 1, further comprising:
sending, when the access category is barred, a NOTIFICATION RESPONSE message to the core network node over non 3GPP access, and not initiating the service request procedure to re-establish a user plane for the one or more Protocol Data Unit (PDU) sessions associated with the 3GPP access.

3. The method according to claim 1, wherein the RRC connection setup request includes an establishment cause associated with the access category.

4. A user equipment (UE) comprising,
a transceiver circuit and a controller;
wherein the controller is configured to:
receive, via the transceiver circuit, when the UE is in a connected mode over a non 3GPP access and in an idle mode over a 3GPP access, a NOTIFICATION message from a core network node over the non 3GPP access;
determine, when performing a service request procedure, MT_acc=0 as an access category to be associated with the service request procedure upon receiving the NOTIFICATION message;
check whether an access attempt for the access category is barred or allowed; and
send, via the transceiver circuit, when the access category is allowed, a Radio Resource Control (RRC) connection setup request to a base station and transmit, via the transceiver circuit, a SERVICE REQUEST message to the core network node after an RRC connection is established.

* * * * *